United States Patent
Lin et al.

(10) Patent No.: US 9,197,879 B2
(45) Date of Patent: Nov. 24, 2015

(54) METHOD FOR MEASURING ENVIRONMENT DEPTH USING IMAGE EXTRACTION DEVICE ROTATION AND APPARATUS THEREOF

(71) Applicant: NATIONAL CHUNG CHENG UNIVERSITY, Chiayi County (TW)

(72) Inventors: Huei-Yung Lin, Chia-Yi (TW); Chun-Lung Tsai, Tainan (TW)

(73) Assignee: National Chung Cheng University, Chiayi County (TW)

( * ) Notice: Subject to any disclaimer, the term of this patent is extended or adjusted under 35 U.S.C. 154(b) by 172 days.

(21) Appl. No.: 13/951,695

(22) Filed: Jul. 26, 2013

(65) Prior Publication Data
US 2014/0362192 A1    Dec. 11, 2014

(30) Foreign Application Priority Data
Jun. 5, 2013 (TW) .............................. 102119899 A (51) Int. Cl.
G06K 9/00 (2006.01)
H04N 13/02 (2006.01)
G06T 7/00 (2006.01)
H04N 13/00 (2006.01)

(52) U.S. Cl.
CPC .......... *H04N 13/0221* (2013.01); *G06T 7/0075* (2013.01); *H04N 2013/0081* (2013.01); *H04N 2213/001* (2013.01)

(58) Field of Classification Search
None
See application file for complete search history.

(56) References Cited

U.S. PATENT DOCUMENTS

| | | | |
|---|---|---|---|
| 4,318,605 A * | 3/1982 | Perisic ......................... | 396/428 |
| 5,157,484 A * | 10/1992 | Pritchard et al. ................ | 348/50 |
| 6,507,665 B1 * | 1/2003 | Cahill et al. .................. | 382/154 |
| 2003/0072483 A1 * | 4/2003 | Chen ............................. | 382/154 |
| 2003/0185551 A1 * | 10/2003 | Chen ............................... | 396/73 |
| 2008/0031513 A1 * | 2/2008 | Hart ............................. | 382/154 |
| 2014/0072205 A1 * | 3/2014 | Ishii .............................. | 382/154 |
| 2014/0177942 A1 * | 6/2014 | Luo et al. ...................... | 382/154 |
| 2014/0267245 A1 * | 9/2014 | Tanger et al. .................. | 345/419 |

* cited by examiner

*Primary Examiner* — Li Liu
(74) *Attorney, Agent, or Firm* — Rosenberg, Klein & Lee (57) ABSTRACT

A measurement method for environment depth and the image extraction device thereof is revealed. First, rotate an image extraction unit and extract a plurality of images using an image extraction device according to different viewing angles of a target object. Then, use disparity information of the plurality of images and an image parameter of the image extraction unit to give a plurality pieces of depth-of-field information, which are further used for giving environment depth information. The image extraction device has an image extraction unit and a rotating member. The rotating member is connected with the base; the rotating member is connected to the image extraction unit, which is located on one side of the rotating member. The plurality of images with different viewing angles are extracted to the image extraction unit as the rotating member rotates about a rotating center to different image extracting locations.

11 Claims, 6 Drawing Sheets

METHOD FOR MEASURING ENVIRONMENT DEPTH USING IMAGE EXTRACTION DEVICE ROTATION AND APPARATUS THEREOF

FIELD OF THE INVENTION

The present invention relates generally to a measurement method and the device thereof, and particularly to a method for measuring environment depth using image extraction device rotation and the image extraction device thereof.

BACKGROUND OF THE INVENTION

In recent years, three-dimensional measurement has been applied extensively to various fields and hence many measurement methods, roughly categorized into contact scanning, non-contact active scanning, and non-contact passive scanning methods, have been developed. The contact scanning method uses a three-dimensional scanner to touch the surface of the object under test for calculating the outline depth of the surface of an object. For example, the coordinate measuring machine (CMM) is a typical contact three-dimensional scanner. In general, the measurement result of contact scanning is quite accurate, making it widely used in engineering and manufacturing industries. Nonetheless, the contact scanning method needs to contact the surface of an object during the scanning process and risking damaging the contact surface of the object under test by probes. Thereby, the contact scanning method is not suitable for the reconstruction of high-priced objects such as antiques or relics. Moreover, compared with other methods, contact scanning requires longer operation time; it cannot measure the surface of soft materials.

Non-contact active scanning means that measurement instruments need to emit light or electron beams to the surface of an object for three-dimensional measurement and acquiring three-dimensional information. The measurement instruments for three-dimensional information can calculate the three-dimensional space information by means of the light beams or energy reflected from the surface of an object. General measurement instrument adopt emitting light beams, such as visible light, infrared light, high-energy light beams, ultrasonic waves, and X rays, to the surface of an object. Nonetheless, the emitted energy or light beams in non-contact active scanning is usually influenced by the variations in the materials of the surface of an object, which induce multiple reflection or scattering and affect the reflected energy received by measurement instruments. Thereby, the measured information is erroneous. Besides, the emitted energy normally has its physical limitation, which influences the measured results. For example, infrared light emitted by various objects and human bodies is filled in the outdoor environment. Accordingly, the measurement instruments using infrared sensor are normally not used for the measurement in the outdoor environment.

The measurement instruments adopting non-contact passive scanning do not emit any energy or light beams. Instead, they receive the light reflect from the surface of an object under test, for example, the ambient light, for performing the measurement for three-dimensional information and achieving the expected effect. In a general environment, it is quite easy to acquire visible light for measurement. Thereby, most measurement instruments of non-contact passive scanning measure the visible light in the measurement environment. In most cases, the measurement instruments adopting non-contact passive scanning technology need no special hardware support. Hence, such kind of passive measurement products are very cheap. For example, the three-dimensional imaging system, namely, the 3D camera, is an important method of this type.

Figure 1:
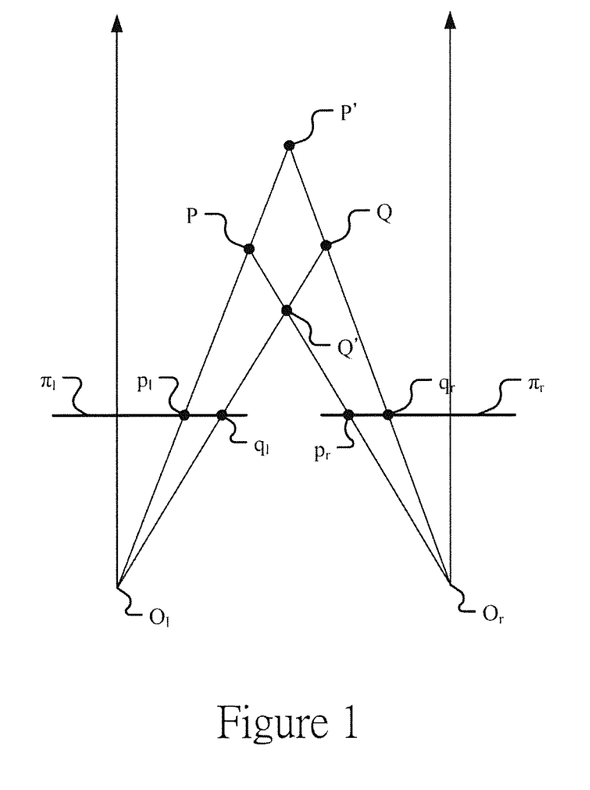
FIG. 1 shows a schematic diagram of the binocular vision system according to the prior art.

Traditional three-dimensional imaging systems adopt two cameras arranged in parallel and aimed at the object to be reconstructed for reconstructing three-dimensional shapes. In concept, this method is similar to human eyes, which deduce the depth of field of an image by matching the image content perceived from both eyes. If the distance between the two cameras and focal length are known and the image contents of the extracted left and right images can be matched successfully, the depth information of the scene recorded in the images can be calculated by triangulation. As shown in FIG. 1, an ideal binocular vision system is taken for example. The left image plane $\pi_l$ and the right image plane $\pi_r$ are coplanar. In the example, $O_l$ and $O_r$ are the projection centers of the left and right cameras, respectively; $p_l$, $p_r$, $q_l$, and $q_r$ are the projection points of the three-dimensional points P and Q to the left and right image planes, respectively. Assuming that $(p_l, q_r)$ and $(q_l, p_r)$ are the calculated corresponding point pairs, then P' and Q' as shown in the figure are given, resulting in erroneous correspondences. Thereby, the corresponding points of the left and right images relates to the correctness of the result. If errors occur in the corresponding points, the acquired three-dimensional location will be influenced by this erroneous correspondence.

Although the cost of equipment of the measurement method of non-contact passive scanning is cheaper than that of other measurement methods described above, the former usually requires multiple cameras for extracting images for measuring the environment depth as well as resolving the errors in the calculation of three-dimensional information due to errors in corresponding points.

Accordingly, the present invention provides a measurement system for three-dimensional information by rotating a single camera. In the present system, multiple images with different viewing angles are captured and used to calculate the feature points in the images. Then the disparity is calculated according to the feature point matching in a plurality of images. The disparity information, together with the parameters of the image extraction device, can be used to deduce the depth information of the scene. Thereby, the effect of a single camera can replace multiple cameras and wider environment depth information can be obtained.

SUMMARY

An objective of the present invention is to provide a method for measuring environment depth using image extraction device rotation and the image extraction device thereof, which use the feature points contained in the images acquired from different viewing angles to calculate the disparity, and then use the disparity to further calculate the depth information of the environment.

Another objective of the present invention is to provide a method for measuring environment depth using image extraction device rotation and the image extraction device thereof, which provides a rotatable image extraction device for acquiring images with different viewing angles. The rotatable image extraction device can provide a way for acquiring the environment depth information more convenient than the image extraction device arranged horizontally.

The present invention provides a method for measuring environment depth using image extraction device rotation. First, extract a plurality of images to an image extraction device according to different viewing angles of a target object. Then, extract a plurality of feature points of the plurality of images. Next, calculate the disparity information of the plurality of images according to the plurality of feature points. Afterwards, acquire a plurality pieces of depth information according to the disparity information of plurality of images, the parameter of the image extraction unit, and the relative locations for image extraction. Finally, calculate the environment depth information according to the plurality pieces of depth information. In other words, according to the present invention, it is not required to use multiple image extraction devices simultaneously for acquiring the required depth information. Moreover, the area containing the depth information is wider than the field covered by a general image extraction device.

The present invention provides an image extraction device for measuring the environment depth, which comprises an image extraction unit, a base, and a rotating member. The base accommodates the image extraction unit using an accommodating space. The rotating member is connected to the base. The image extraction device is disposed on the rotating member and located on one side of the rotating member according to a rotating center of the rotating member. The image extraction unit extracts a plurality of images of a target object by rotating to different image extracting locations. The plurality of images corresponds to different viewing angles of the target object. Accordingly, a single image extraction device is provided for extracting images of different viewing angles and for performing subsequent calculations.

DETAILED DESCRIPTION

In order to make the structure and characteristics as well as the effectiveness of the present invention to be further understood and recognized, the detailed description of the present invention is provided as follows along with embodiments and accompanying figures.

Figure 2:
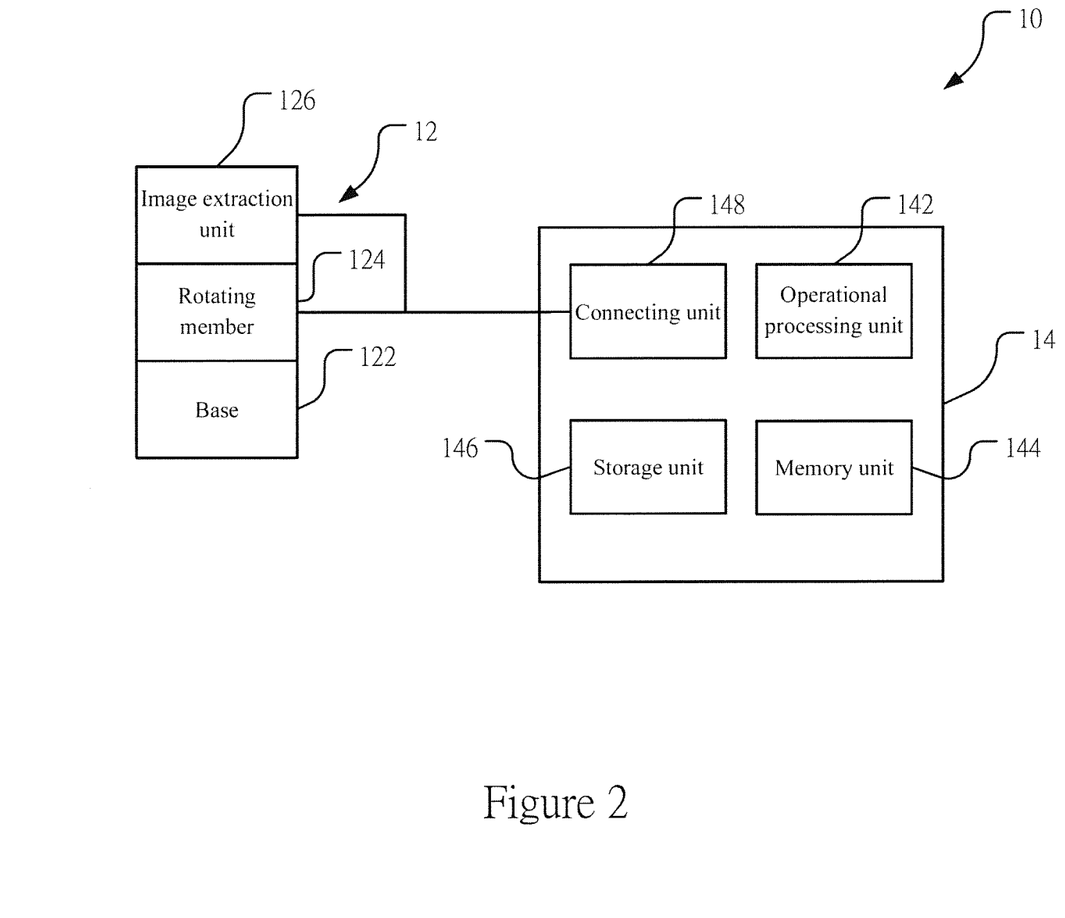
FIG. 2 shows a block diagram according to an embodiment of the present invention.
Figure 3:
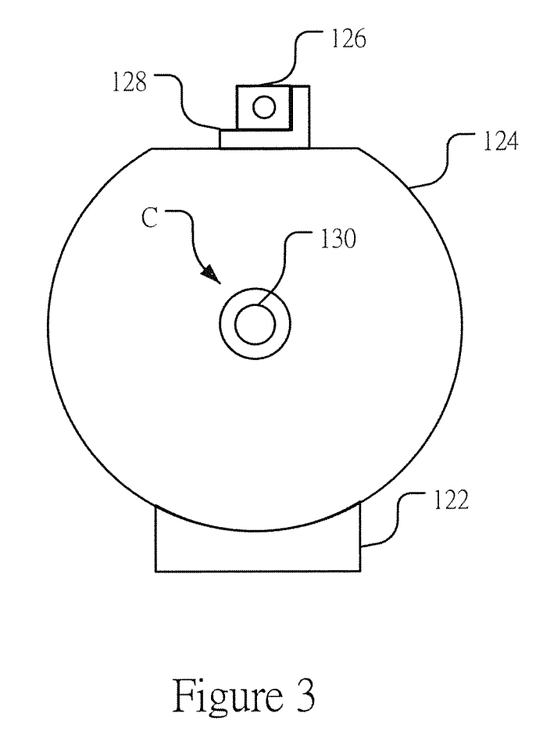
FIG. 3 shows a partial structural schematic diagram according to an embodiment of the present invention.
Figure 4:
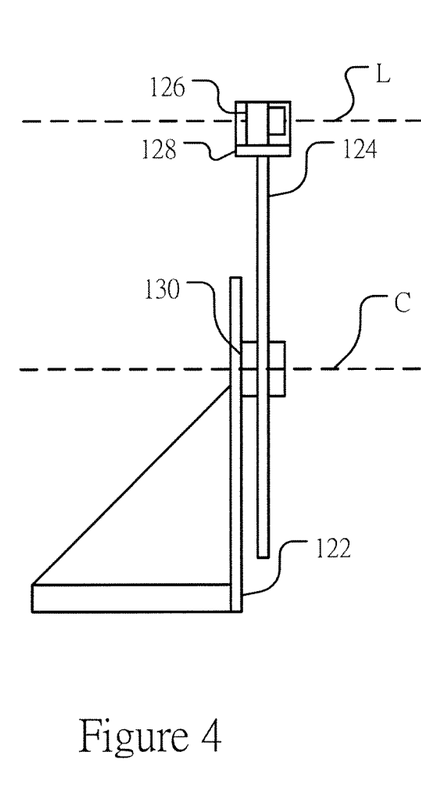
FIG. 4 shows a side view of FIG. 3.

FIGS. 2 to 4 show a block diagram and partial structural schematic diagrams according to an embodiment of the present invention. As shown in FIG. 2, the depth information measurement system 10 according to the present invention comprises an image extraction device 12 and an operational control device 14. The image extraction device 12 includes a base 122, a rotational member 124, and an image extraction unit 126. The operational control device 14 includes an operational processing unit 142, a memory unit 144, a storage unit 146, and a connecting unit 148. In addition, as shown in FIG. 3 and FIG. 4, the rotational member 124 further includes a fixing holder 128; a rotational axis 130 is further disposed between the rotational member 124 and the base 122.

The rotational axis 130 of the rotational member 124 is parallel the optical axis of the image extraction unit 126. The rotational member 124 is disposed on the base 122. The image extraction unit 126 is disposed on the rotational member 124. Besides, the image extraction unit 126 is connected electrically with the connecting unit 148, such as universal serial bus port (USB port), IEEE1394 bus port, high definition multimedia interface port (HDMI port), of the operational control device 14. The operational processing unit 142, the memory unit 144, and the storage unit 146 are connected electrically with the connecting unit 148. In other words, the operational processing unit 142 receives the images extracted by the image extraction unit 126 via the connecting unit 148 and the images can be stored in the storage unit 146.

According to the present embodiment, the operational control device 14 controls the rotational member 124 to rotate. Thereby, the connecting unit is further connected to the rotational member 124. After the operational control device 14 receives the images extracted by the extraction unit 126 via the connecting unit 148, it performs matching calculations on the received image and gives plurality pieces of disparity information corresponding to the images of different viewing angles. Then, the plurality pieces of disparity information are used to give plurality pieces of depth information for further calculating the environment depth information.

Refer again to FIG. 4. The base 122 is a right-angle frame. A rotational axis 130 passes through one side of the base 122 and the rotational center C of the rotational member 124, enabling the rotational member 124 to rotate about the rotational center C. Thereby, the image extraction unit 126 can rotate to different image extracting locations and thus extracting a plurality of image with different viewing angles. The optical axis of the image extraction unit 126 moves according to different image extracting locations, and hence resulting in minor shifts between images captured from different viewing angles.

Figure 5:
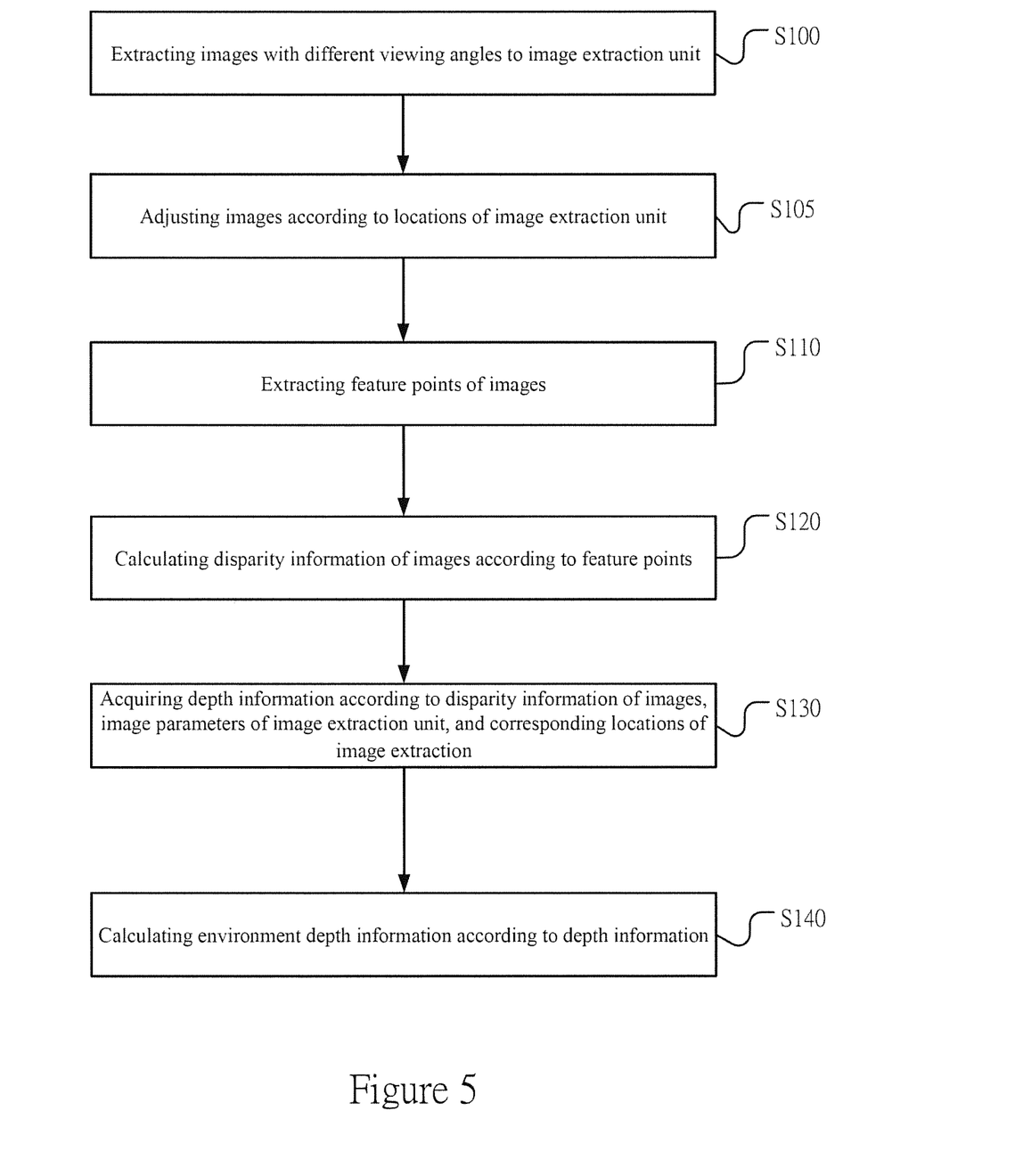
FIG. 5 shows a flowchart according an embodiment of the present invention.

FIG. 5 shows a flowchart according an embodiment of the present invention. As shown in the figure, the method for measuring environment depth according to the present invention comprises the following steps:

Step S100: Extracting images with different viewing angles to the image extraction unit;

Step S105: Adjusting the images according to the locations of the image extraction unit;

Step S110: Extracting the feature points of the images;

Step S120: Calculating the disparity information of the images according to the feature points;

Step S130: Acquiring the depth information according to the disparity information of the images, the parameters of the image extraction unit, and the corresponding locations of image extraction; and Step S140: Calculating the environment depth information according to the depth information.

In the step S100, the image extraction unit 126 extracts the images of at least a target object with different viewing angles. According to the present embodiment, the image extraction unit 126 extracts a plurality of images of the target object at different image extracting locations as the rotational member 124 rotates one full cycle about the rotational center C. Then the plurality of images is transmitted to the operational control device 14 for subsequent processing. There is a nonzero interval between the rotational center C and the image extraction unit 126. Thereby, the image extraction unit 126 is not placed at the rotational center C for rotating. When the image extraction unit 126 rotates, the optical axes L of respective image extracting locations are parallel with the rotational axis 130. In the step S105, the operational control device 14 adjusts the horizontal viewing angles of the plurality of images to the corresponding horizontal viewing angles according to image extracting locations of the plurality of images extracted by the image extraction unit 126. Hence, the plurality of images can be processed at the corresponding horizontal viewing angles. For example, form a baseline by connecting the optical projection centers of two of the images for adjusting the horizontal viewing angles of the two images to the horizontal viewing angle corresponding to the baseline.

Figure 6:
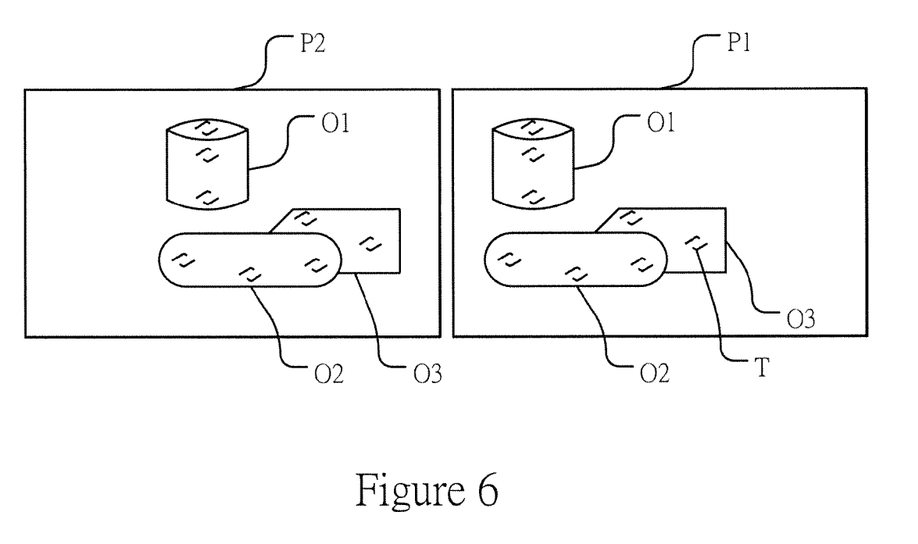
FIG. 6 shows a schematic diagram of extracting feature points according to an embodiment of the present invention.
Figure 7:
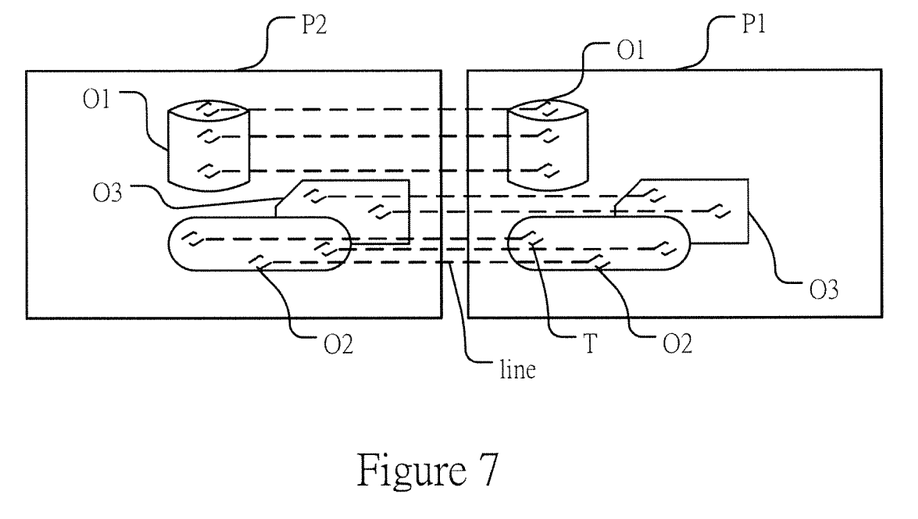
FIG. 7 shows a schematic diagram of matching feature points according to an embodiment of the present invention.

In the step S110, as shown in FIG. 6, the present embodiment uses two images with different viewing angles for description. The operational processing unit 142 of the operational control device 14, accompanied by the memory unit 144, executes an operational program for feature point extraction. The operational program for feature point extraction adopts at least an algorithm to extract the required feature point T of the first image P1 and the second image P2 extracted by the image extraction unit 126. The target objects O1, O2, O3 have at least a feature point T, respectively. For example, adopt the scale-invariant feature transform (SIFT) algorithm, the speeded up robust features (SURF) algorithm, the histogram of oriented gradient (HOG) descriptor, or any combination of the above to extract the required feature point T of the first image P1 and the second image P2. In the step S120, as shown in FIG. 7, the operational control device 14 cross compares the plurality of images grouped in sets of two images according to the feature points T given in the step S110 and acquires the disparity information of the plurality of images. According to the present embodiment, the first image P1 and the second image P2 are used as an example. The plurality of feature points T of the first image P1 matches the plurality of feature points T of the second image P2 according to the image property such as the difference in gradient or intensity values between the adjacent pixels. Thereby, the shift of the feature points at different viewing angles can be calculated and thus giving the disparity information of the plurality of images.

In the step S130, the operational control device 14 calculates according to the disparity information acquired in the step S120 and the parameters of the image extraction unit 126 for giving plurality pieces of depth information corresponding to the plurality of images. In the step S140, the operational control device 14 calculates according to the plurality pieces of depth information acquired in the step S130 for giving corresponding environment depth information of the plurality of images.

Figure 8:
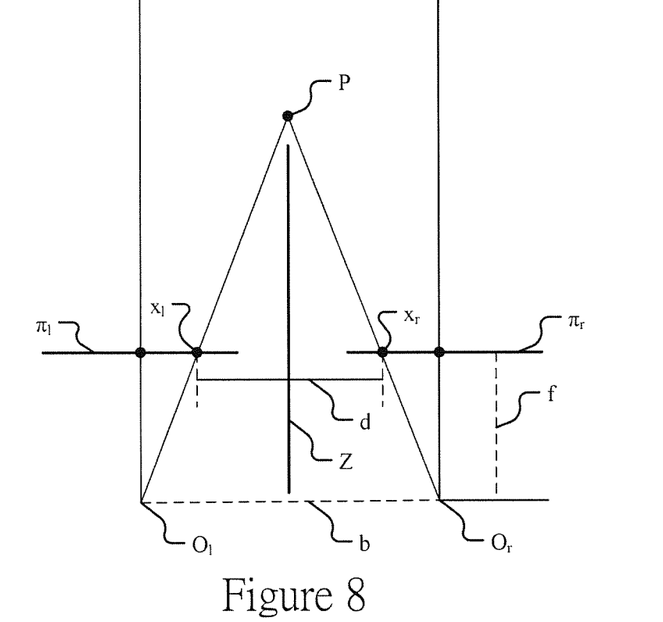
FIG. 8 shows a schematic diagram of triangulation according to an embodiment of the present invention.

The environment depth measurement according to the present invention does not require multiple image extraction devices. In addition, the operational control unit 14 according to the present invention uses the partial feature point T of the first and second images P1, P2 to calculate the shift of the feature point T under the condition that the first and second images P1, P2 are matched and thus deriving the disparity information and acquiring the depth information. As shown in FIG. 8, the operational processing device 14 calculates in a three-dimensional system. The coordinate of the point P=(X, Y, Z) can be given by the following equation:

$$Z = f \times \frac{b}{d} \quad (1)$$

where Z is the depth in the three-dimensional space; f is the focal length of the camera; b is the baseline of two cameras, namely, the distance between the two projection centers of the left and right cameras; and d is equal to $(x_l - x_r)$, which is the disparity. After acquiring the depth information in the Z direction, the coordinates of the point in the X and Y directions can be deduced from the perspective projection equation of a pinhole camera as shown below:

$$X = \frac{x}{f} \times Z \quad (2)$$

$$Y = \frac{y}{f} \times Z \quad (3)$$

Figure 9:
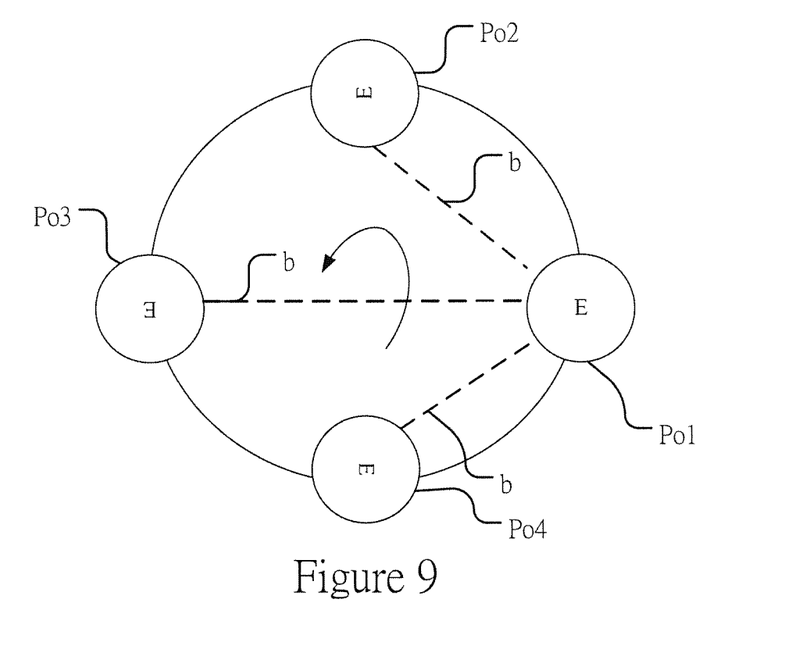
FIG. 9 shows a schematic diagram of rotating image extracting locations according to an embodiment of the present invention.

As shown in FIG. 9, thanks to the rotation of the rotating member 124, the image extraction unit 126 acquires a plurality of images with different viewing angles. While rotating, the location of the image extraction unit 126 is fixed to the plane perpendicular to its optical axis. Thereby, the disparity information can be derived with ease for any two locations. In other words, calculate the baseline b between adjacent image extraction locations by using the rotation angle information and rotate the adjacent images to identical horizontal viewing angle. Then can calculate the disparity from the two images having identical horizontal viewing angle. After knowing the disparity, the equations (1), (2), (3) can be used for deducing the depth information. The image extraction unit 126 exhibits different horizontal viewing angles E at different image extracting locations Po1, Po2, Po3, Po4. The dashed line b is the baseline of the camera between two adjacent locations. After the image extraction unit 126 extracts images at different locations, the operational control device 14 uses the epipolar geometry to further rectify the image and the corresponding image to the identical horizontal viewing angle. Namely, the horizontal scanning lines of the two images are parallel with the baseline. Afterwards, the stereo matching algorithm can be used to calculate the disparity information of the corresponding point and the whole image, as shown in FIG. 6 and FIG. 7.

For example, as in FIG. 6, we get the location of a feature point (60, 10) in P1 corresponding to a feature point (40, 10) in P2. Thereby, we can get the disparity d as 60-40=20. Besides, we further substitute the known image parameters, including the focal length 2000 mm and the location difference b (baseline) 30 cm, into the equation (2), it gives the environment depth information Z of the point as $$2000 \text{ mm} \times \frac{30 \text{ cm}}{40} = 150 \text{ cm.}$$

According to the present embodiment, four image extracting locations are used as an example. Nonetheless, the present invention is not limited to the example. During rotating, if the frequency of sampling (images taken) is higher, the common field region covered by two adjacent images is wider. Thereby, the range for calculating the depth information is broader. Because the present method acquires the depth information by rotating the image extraction unit 126 by one turn, the range of the depth information given by the method for measuring environment depth using image extraction device rotation according to the present invention is wider than the field covered by a general binocular vision system.

To sum up, the present invention relates to a method for measuring environment depth using image extraction device rotation and the image extraction device thereof. The present invention provides an image extraction device rotating about a rotating center to different image extracting locations for extracting a plurality of image of at least a target object at different viewing angles. In addition, according to the plurality of images captured with different viewing angles, plurality pieces of disparity information are calculated and the depth information is thus derived. Thereby, the environment depth information is obtained according to the depth information.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A measurement method for environment depth, comprising steps of:
   rotating an image extraction unit, the optical axes of respective image extracting locations parallel to a rotating axis for acquiring different viewing angles of a target object, and
   extracting a plurality images to said image extraction unit according to said different viewing angles of said target object;
   acquiring a plurality pieces of depth information according to a disparity information of said images and the parameter of said image extraction unit; and
   calculating an environment depth information according to said plurality pieces of depth information, said plurality pieces of depth information including a focal length of the image extraction unit.

2. The measurement method for environment depth of claim 1, further comprising steps of: extracting a plurality of feature points of said images; calculating the disparity information of said images according to said feature points.

3. The measurement method for environment depth of claim 2, wherein a scale-invariant feature transform (SIFT) algorithm, a speeded up robust features (SURF) algorithm, a histogram of oriented gradient (HOG) descriptor, or a corner detection method is adopted in said step of extracting a plurality of feature points of said images for acquiring said plurality of feature points of said images.

4. The measurement method for environment depth of claim 1, wherein said rotating axis is parallel to said optical axes, the distances between said rotating axis and said optical axes are nonzero, and said image extraction unit rotates about a rotating center in said step of extracting a plurality images to an image extraction unit according to a target object.

5. The measurement method for environment depth of claim 1, further comprising a step of: adjusting the relative horizontal viewing angles of said images.

6. The measurement method for environment depth of claim 5, wherein after adjusting the relative horizontal viewing angles of said images, a plurality of horizontal shifts exist between a plurality of feature points and said plurality of images.

7. The measurement method for environment depth of claim 1, wherein comparing a plurality of feature points of two adjacent images and calculating shifts of said feature points for producing said disparity information in said step of calculating disparity information of said plurality of images according to said feature points.

8. The measurement method for environment depth of claim 7, wherein said shifts of said plurality of feature points correspond to the intervals between different image extracting locations of said image extraction unit.

9. An apparatus for measuring environment depth, comprising:
   a rotating member, having a rotating axis parallel to an optical axis;
   an image extraction unit, disposed fixedly to one side of said rotating member, parallel with said optical axis, rotating to a plurality of image extracting locations according to said rotating center, and extracting a plurality of images of at least a target object at different viewing angles according to said image extracting locations;
   an operational processing unit, receiving said plurality of images extracted from the image extraction unit, calculating an environment depth information according to said plurality pieces of depth information, said plurality pieces of depth information including a focal length of the image extraction unit.

10. The apparatus for measuring environment depth of claim 9, wherein said plurality of images have a plurality of feature points, respectively, and shifts of said feature points on different images correspond to the intervals of said image extraction unit at different image extracting locations.

11. The apparatus for measuring environment depth of claim 9, further comprising a base disposed under the rotating member.

* * * * *